April 27, 1954
S. SHAPIRO
2,676,323
REMOVABLE STORM LINING FOR TOPCOATS
Filed April 26, 1952
3 Sheets-Sheet 1
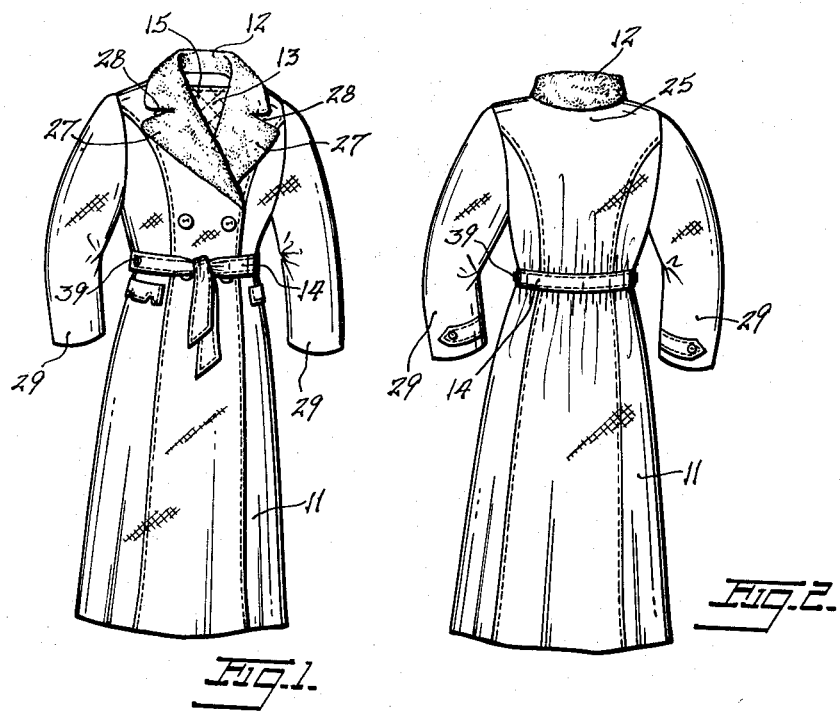
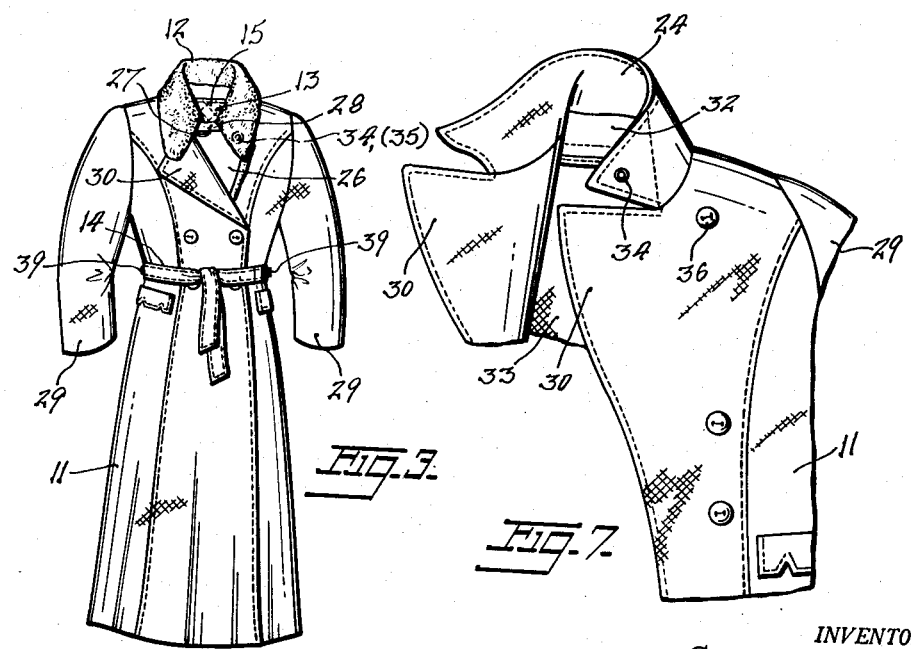
INVENTOR.
SAMUEL SHAPIRO
BY
*Zoltan P. Holacsek*
ATTORNEY April 27, 1954     S. SHAPIRO     2,676,323
REMOVABLE STORM LINING FOR TOPCOATS
Filed April 26, 1952     3 Sheets-Sheet 2

INVENTOR.
SAMUEL SHAPIRO
BY
ATTORNEY

April 27, 1954 S. SHAPIRO 2,676,323
REMOVABLE STORM LINING FOR TOPCOATS
Filed April 26, 1952 3 Sheets-Sheet 3

INVENTOR
SAMUEL SHAPIRO
BY
ATTORNEY

Patented Apr. 27, 1954

2,676,323

UNITED STATES PATENT OFFICE 2,676,323

REMOVABLE STORM LINING FOR TOPCOATS

Samuel Shapiro, Metuchen, N. J.

Application April 26, 1952, Serial No. 284,555

8 Claims. (Cl. 2—97)

1

This invention relates to a top coat provided with a removable lining and collar.

It is a principal object of the invention to provide a removable storm lining for a top coat which lining includes a fur collar and sleeve linings.

It is a further object to provide a removable storm lining as aforesaid, including lapels arranged to form a fur lined cravat for greater warmth.

It is a further object to provide a removable storm lining for an outer coat which includes a fur collar, furred lapels and felted body joined by an intermediate fabric facing intended to avoid bulkiness in the garment when the storm lining is assembled in the coat.

It is a further object to provide slide fastener means for readily attaching the storm lining as aforesaid to the outer coat with means for fastening certain collar portions to the coat to insure a smart appearance.

For further comprehension of the invention and of the objects and advantages thereof, reference will be had to the following description and accompanying drawings, and to the appended claims in which the various novel features of the invention are more particularly set forth.

On the accompanying drawings forming a material part of this disclosure:

Fig. 1 is an elevational view of a top coat assembled with the storm lining embodying the invention.

Fig. 2 is a rear view of the coat of Fig. 1.

Fig. 3 is a view corresponding to Fig. 1 with the lapel portions of the storm lining forming a cravat.

Fig. 7 is a fragmentary elevational view of the top coat to which the storm lining is to be assembled.

2

Figure 4:
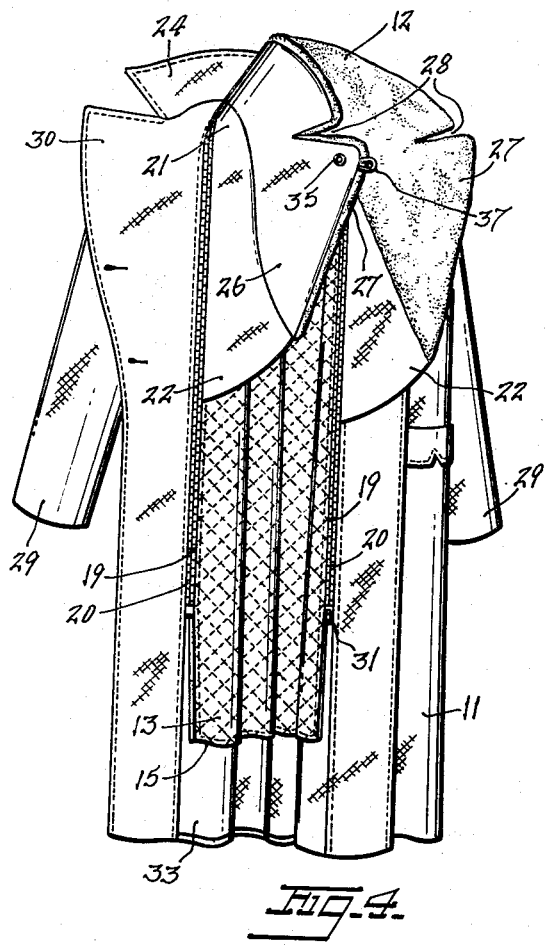
Fig. 4 is an elevational view of the top coat of Fig. 1 with the coat opened to show the disposition of the storm lining therein.

In the art of garment construction it is known to provide removable linings for outer coats to increase the warmth and comfort afforded thereby in inclement weather. Such linings have heretofore been confined to limited portions of the coats in which they are used such as sleeves, collars or upper body portions. Applicant proposes in accordance with the invention to provide a removable complete storm coat lining which when disposed in a top coat presents a smart, luxurious and stylish appearance. The storm lining is adapted for light cloth coats, top coats, and rain coats as commonly worn by women.

The storm coats formed with the storm lining include a fur collar, fur lapels, sleeve linings and belted body lining. The storm lining is added to an outer coat with complete concealment of the lining fastener elements.

The storm lining is so arranged that undue bulk is avoided at the neck and shoulders of the wearer while maximum warmth and comfort is assured by the unique manner in which furred and felted parts are joined. The added lining appears to be an integral part of the outer coat when assembled therewith.

The coat 11 shown in Figs. 1 to 4 may be a light top coat of any suitable fabric. It may if desired be a raincoat of water resistant or waterproof material. In general it is desired to provide a lining for a light outer coat not provided with a storm lining so that the coat 11 will usually be of rather light construction.

The coat 11 is shown in Figs. 1 to 4 with the storm lining embodying the invention assembled therein. The fur collar 12 and quilted or felted body portion 13 of the storm lining are visible in Figs. 1 and 4. The coat 11 is generally of conventional construction. A belt with sections 14 and 14' is provided to take in the coat at the waist. The storm lining embodying the invention is best shown in Figs. 4 to 9. The storm lining 15 comprises a quilted or felted body portion 13 covered with a lining 16 at the rear thereof. A pair of padded sleeve linings 17 are attached to body 13. The sleeve linings have knitted wrist bands 18 at the ends thereof. A slide fastener 19 is attached to substantially the entire perimeter of the body portion 13 except at the bottom and lower side portions. A mating slide fastener 20 is provided on the inside of the coat 11 for engaging the slide fastener portion 19. Attached to the body portion 13 is a relatively thin doubled strip 21 of fabric extending over the entire top of the lining 15.

This strip 21 or facing is particularly intended to prevent bulkiness when the storm lining 15 is inserted in the coat 11 and insures that the collar 12 and body portion 13 lie smoothly on the collar 24 and upper portion 25 of coat 11. The facing 21 has generally triangular widened portions 22 at its ends which continue as a narrow portion 23 across the top of the coat. Attached to the facing 21 is the collar 12 of fur or fleece with a fabric lining 26. The collar is attached to large fur lapels 27. A deep V-cut 28 is provided between each lapel and collar so that lapels 27 may be closed to form a double furred layer over the chest of the wearer. The lining 26 of the collar extends over the back of the lapels also and is preferably made of the same material as that of the coat. Facing 21 is of doubled fabric as shown at 23, and 23' in Figs. 6 and 9.

To assemble the storm lining 15 in the coat the sleeves 17 of the lining are inserted within sleeves 29 of the coat 11. Slide fastener portions 19 and 20 are then juxtaposed and the fastener portions attached with slider 31. The fur collar 12 is then raised and folded over the collar 24 of coat 11. The presence of facing 21 prevents bulkiness in the fold and immediately beneath it. Note in Fig. 9 that there are just four thin cloth layers: 23 and 23' of facing 21, a coat facing 32 and outside cloth layer 25. The thickness of this portion of the assembly is substantially that of the original folded coat collar 24 with its four layers clearly shown in Fig. 9. The body portion 13 of the lining with its lining 16 overlies the lining 33 of the coat 11 and the outside layer 25. To the lining 33 of the coat 11 is attached at its upper end the slide fastener supporting fabric strip 40 and the facing 32.

Figure 8:
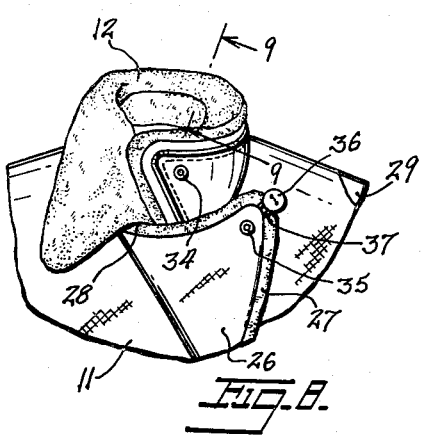
Fig. 8 is a fragmentary view of the top portion of the assembly of coat and lining showing the arrangement of collar and cravat portions.
Figure 9:
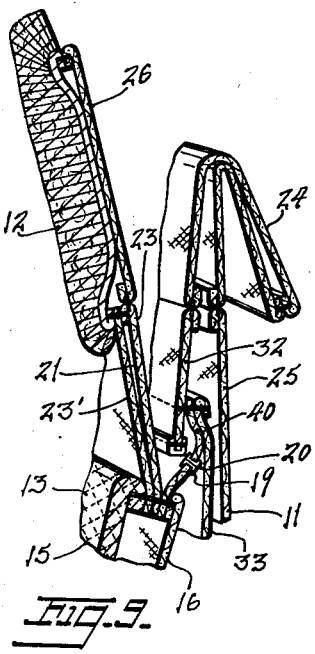
Fig. 9 is a sectional view taken on lines 9—9 of Fig. 8 of a portion of the storm lining and coat.

A snap fastener portion 34 is mounted on the back of the collar 24 as shown in Figs. 7 and 8. Fastener portion 34 engages a fastener portion 35 attached to the rear of lapel 27 on lining 26.

Button 36 is attached to the shoulder of coat 11 and engages a loop 37 on one lapel 27 of the lining 15. The loop 37 is clearly shown in Fig. 4 and its manner of joining to button 36 is shown in Fig. 8. When the storm lining is assembled in coat 11, the lapels 27 of the storm lining can be arranged to form a double furred layer with the aid of the fastening elements 34, 35, 36 and 37. In Figs. 3 and 8 are shown the manner of forming the cravat. One lapel 27 of the storm lining faces the chest of the wearer. The other lapel 27 is also extended across the chest of the wearer and is held in position by loop 37 engaging button 36. The collar 24 of the coat 11 is then folded down and the fastener portion 34 engages on fastener portion 35. Fur collar 12 lies smoothly on collar 24 and appears to be the original collar of the coat since all fastener elements are concealed.

Figure 10:
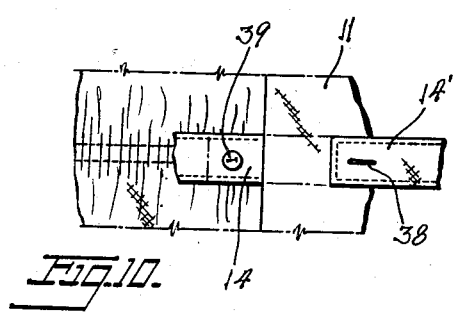
Fig. 10 is a fragmentary view of a certain detail of the coat belt construction.
Figure 5:
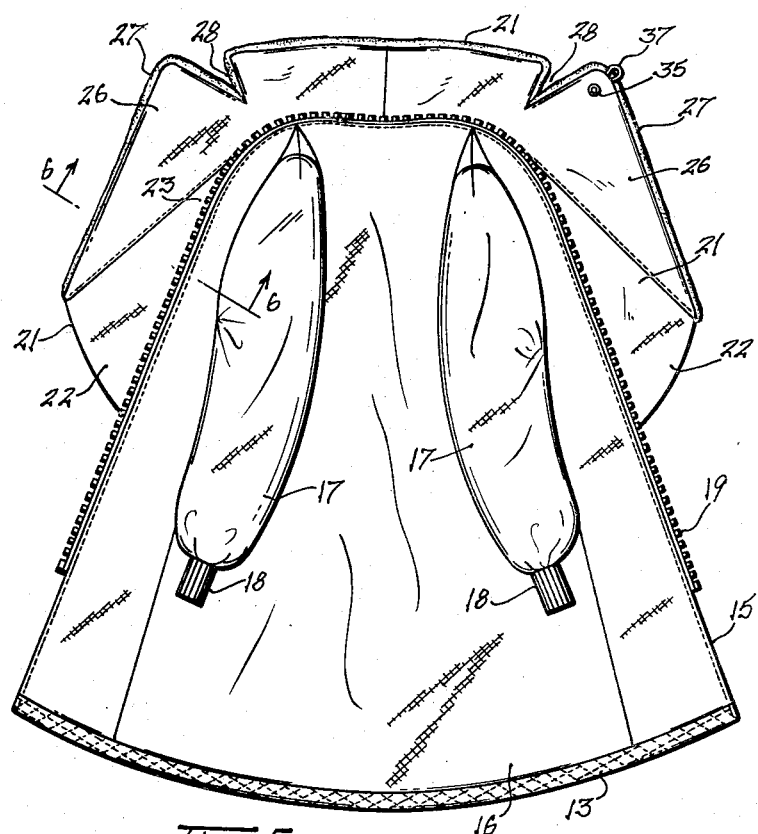
Fig. 5 is a rear elevational view of the storm lining embodying the invention.
Figure 6:
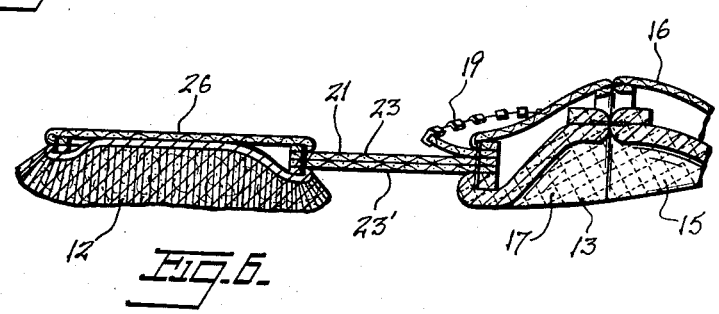
Fig. 6 is a sectional view taken on lines 6—6 of Fig. 5.

A belt is provided which completely encircles the waist of the coat. Belt portion 14 is attached at one end to a side of the coat as shown in Figs. 1 and 10, and encircles the waist of the coat to be tied with a separate belt portion 14'. Belt portion 14' has a button-hole 38 which engages with button 39 at the side of the coat 11.

The storm lining thus provided serves as a complete removable supplementary lining for a top coat. The lining not only provides warmth and additional comfort at the body portions as in conventional removable linings but also includes sleeves linings, collar and cravat portions.

Of especial importance is the facing provided between the body lining portion and collar of the storm lining to reduce bulk and insure smooth fitting of the storm lining to the coat. The concealed fasteners which hold the coat collar and cravat portions in place cause the assembled coat and added storm lining to present a neat appearance at all times when the coat is being worn with lapels turned in to form the double furred cravat.

While I have illustrated and described the preferred embodiments of my invention, it is to be understood that I do not limit myself to the precise construction herein disclosed and the right is reserved to all changes and modifications coming within the scope of the invention as defined in the appended claims.

Having thus described my invention, what I claim as new and desire to secure by United States Letters Patent is:

1. A storm lining for an outer coat comprising a quilted body a fur collar secured to said body, fur lapels extending from the collar and slanting outwardly of the body, a strip attached between the lining body and the collar and lapels to lie adjacent the neck of the wearer each lapel and said strip being of a width to form a double layer over the chest of the wearer when in overlapping condition, a body lining attached to the quilted body and strip, and a fastener attached along the edge of the body lining for engagement with a fastener on the outer coat.

2. In an outer coat, means in the coat for removably fastening a storm lining, said coat having a collar, a fastener attached to the outside of said collar, said storm lining comprising a quilted body a fur collar secured to said body, a pair of fur lapels extending from said collar, a strip secured to the body and having a narrow portion between the body and said fur collar and wide portions between the body and said fur lapels, a body lining attached to said fur collar and fur lapels, sleeve linings attached to said body lining, a fastener means attached to said quilted body for engaging the first named means, and a fastener disposed at the rear of one of said lapels for engaging the first named fastener.

3. In an outer coat, a collar attached to said coat, a fastener on the underside of said collar, a button attached to a shoulder portion of the coat, a storm lining having a body portion supporting a fur collar, fur lapels slanting from said fur collar, a strip between said lining body, and the collar and lapels, each lapel and said strip being of a width to form a double layer over the chest of the wearer when in overlapping condition, said fur collar overlying said first named collar, a fastener attached to the rear of one of said lapels and engageable with the first named fastener and a loop attached to said one lapel and engageable with said button.

4. In an outer coat, a collar attached to said coat, a storm lining having a body portion supporting a fur collar, lapels slanting from said collar, a strip attached between the lining body and fur collar and lapels having a narrow portion adjacent the fur collar and wide portions adjacent said lapels each lapel and said strip being of a width to form a double layer over the chest of the wearer when in overlapping condition, said fur collar overlying said first named collar, a fastener attached to one of said lapels and engageable with a fastener on the first named collar.

5. In an outer coat, a collar attached to said coat, a belt attached to the waist of the coat, a removable storm lining disposed in the coat comprising a felted body portion, a lining for said body portion, a strip attached to said body portion formed of two plies of fabric, a slide fastener attached to the top and sides of said body portion, a fur collar attached to said strip at the top thereof, fur lapels attached to said strip at the sides thereof, and a slide fastener attached to the top and sides of the coat for engaging the first named slide fastener.

6. In an outer coat, having sleeves, a removable storm lining, having sleeve linings extending into said sleeves, a felted lining attached to said sleeve linings, a slide fastener attached to said felted lining, a strip attached to said felted lining at the top thereof, a fur collar attached to said strip, fur lapels attached to said strip, each lapel and said strip being of a width to form a double layer over the chest of the wearer when in overlapping condition and a slide fastener attached to said coat at interior portions thereof for engaging with the first named fastener.

7. In an outer coat, a detachable storm lining construction including a quilted body, a lining on the rear of said body, padded sleeves attached to the quilted body for insertion into the sleeves of the outer coat, wrist bands on the ends of said sleeves, a slide fastener attached to substantially the entire perimeter of the quilted body adapted for coaction with a slide fastener secured to the outer coat, a fur collar attached to the top of said quilted body, fur lapels attached to the quilted body and said collar, a strip attached to the quilted body and interposed between the body and the collar and lapels, each lapel and said strip being of a width to form a double layer over the chest of the wearer when in overlapping condition.

8. In a combination garment, an outer coat having a collar about the neck opening and lapels extending from said collar, and component parts of a closure fastener attached to parts adjacent its front opening, a detachable storm lining including a quilted body, a lining on the rear of said body, padded sleeves attached to the quilted body for insertion into the sleeves of the outer coat, wrist bands on the ends of said sleeves, a slide fastener attached to substantially the entire perimeter of the quilted body and adapted to coact with the parts of the closure fastener on the outer coat, a fur collar attached to the top of said quilted body and overlying the collar on the outer coat, fur lapels attached to the quilted body and said collar and overlying the lapels on the outer coat, a strip attached to the quilted body and interposed between the body and the collar and fur lapels, each lapel and said strip being of a width to form a double layer over the chest of the wearer when in overlapping condition.

References Cited in the file of this patent

UNITED STATES PATENTS

| Number | Name | Date |
|---|---|---|
| 2,483,015 | Levy | Sept. 27, 1949 |
| 2,617,106 | Pritzker | Nov. 11, 1952 |

FOREIGN PATENTS

| Number | Country | Date |
|---|---|---|
| 5,831 | Switzerland | Nov. 11, 1952 |